United States Patent
Hoctor et al.

(10) Patent No.: US 7,099,422 B2
(45) Date of Patent: Aug. 29, 2006

(54) SYNCHRONIZATION OF ULTRA-WIDEBAND COMMUNICATIONS USING A TRANSMITTED-REFERENCE PREAMBLE

(75) Inventors: Ralph Thomas Hoctor, Saratoga Springs, NY (US); Stephen Michael Hladik, Albany, NY (US)

(73) Assignee: General Electric Company, Niskayuna, NY (US)

( * ) Notice: Subject to any disclaimer, the term of this patent is extended or adjusted under 35 U.S.C. 154(b) by 845 days.

(21) Appl. No.: 10/125,092

(22) Filed: Apr. 19, 2002

(65) Prior Publication Data

US 2003/0198308 A1 Oct. 23, 2003

(51) Int. Cl.
H04L 7/00 (2006.01)
H04L 27/00 (2006.01)

(52) U.S. Cl. ............... 375/354; 375/256; 375/259
(58) Field of Classification Search ........... 375/354, 375/130, 256, 142, 259, 219, 295, 316, 342, 375/343, 377; 327/1, 18, 28; 332/185; 380/35, 380/33
See application file for complete search history.

(56) References Cited

U.S. PATENT DOCUMENTS

| | | | |
|---|---|---|---|
| 4,641,317 A | 2/1987 | Fullerton | |
| 6,433,739 B1 * | 8/2002 | Soliman | 342/387 |
| 2002/0137510 A1 * | 9/2002 | Sims et al. | 455/427 |
| 2003/0108133 A1 * | 6/2003 | Richards | 375/351 |

OTHER PUBLICATIONS

"Ultra-Wideband Communications System," HW Tomlinson et al., U.S. Appl. No. 09/753,443, filed Jan. 3, 2001.
"Ultra-Wideband Communications System and Method Using a Delay Hopped, Continuous Noise Transmitted Reference," RT Hoctor et al., U.S. Appl. No. 09/974,032, filed Oct. 10, 2001.
"Transmitter Location for Ultra-Wideband, Transmitted-Reference CDMA Communication System," RT Hoctor et al., U.S. Appl. No. 09/973,140, filed Oct. 9, 2001.
"Method and Apparatus for Synchronizing a Radio Telemetry System by Way of Transmitted-Reference, Delay-Hopped Ultra-Wideband Pilot Signal," RT Hoctor et al., U.S. Appl. No. 10/125,091, filed Apr. 19, 2002.
"Impulse Radio: How it Works," MZ Win, RA Sholtz, IEEE Comm. Letters, vol. 2, pp. 36-38.
"Communications Systems Engineering," JG Proakis, M. Salehi, Prentice Hall, 1994, pp. 439-442.

(Continued)

Primary Examiner—Jay K. Patel
Assistant Examiner—Sophia Vlahos
(74) Attorney, Agent, or Firm—Fletcher Yoder

(57) ABSTRACT

A method and apparatus of initial synchronization, or acquisition, of time modulated ultra-wideband (UWB) communications uses a transmitted-reference preamble. The method and apparatus require that the transmitter first send a time-reference, delay-hopped (TR/DH) burst; such a burst is easily detected and can be processed to provide a time mark accurate to within a few nanoseconds. Following the transmission of the TR/DH burst, the transmitter waits a fixed period of time, the duration of which is known to the receiver, and then the transmitter sends a burst of pulse position modulation, time hopped (PPM/TH) or other time modulated UWB. After the reception of the first burst, the receiver can estimate the time of reception of the second burst to the accuracy of the time mark.

33 Claims, 10 Drawing Sheets

OTHER PUBLICATIONS

"Spread Spectrum Communications Handbook," Revised Edition, MK Simon, JK Omura, RA Sholtz, BK Levitt, McGraw-Hill, 1994, p. 10.

"Multiple Access With Time-Hopping Impulse Modulation," RA Sholtz, Proc. IEEE Milcom '93. Boston, MA, Oct. 1993, pp. 447-450.

"Acquisition Sequences in PPM Communications," R. Gagliardi, J. Robbins, H. Taylor, IEEE Trans. Information Theory, vol. IT-33, Sep. 1987, pp. 738-744.

"Antennas and Propagation for Wireless Communication Systems," Saunders et al., John Wiley & Sons, 1999, pp. 282-285.

* cited by examiner

| $N_p$ pulse pairs separated by time $D_1$ with data bit $B_1$ | $N_p$ pulse pairs separated by time $D_2$ with data bit $B_2$ | ... | $N_p$ pulse pairs separated by time $D_{(Nc-1)}$ with data bit $B_{(Nc-1)}$ | $N_p$ pulse pairs separated by time $D_{Nc}$ with data bit $B_{Nc}$ |
|---|---|---|---|---|
| Chip interval 1. | Chip interval 2. | | Chip interval $N_c$-1. | Chip interval $N_c$. |

*Fig. 1*

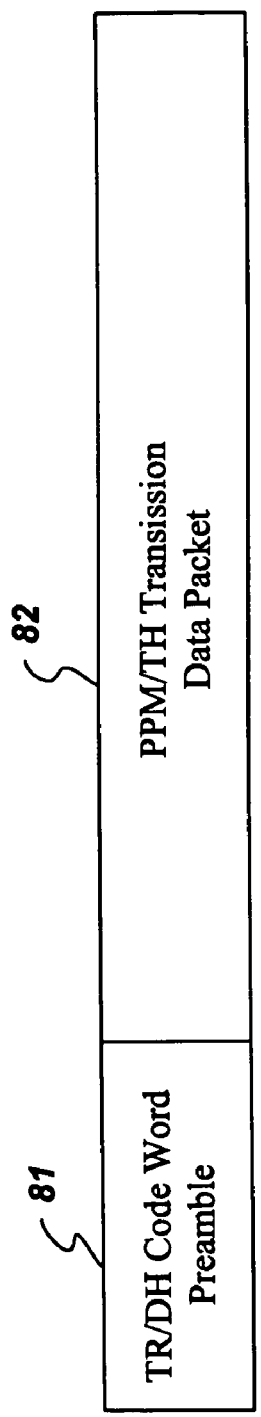
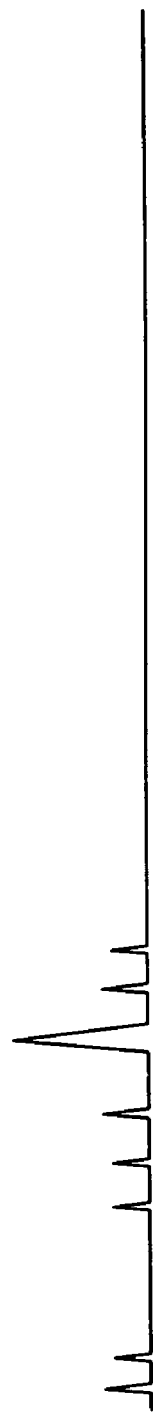
Fig. 11
Fig. 12

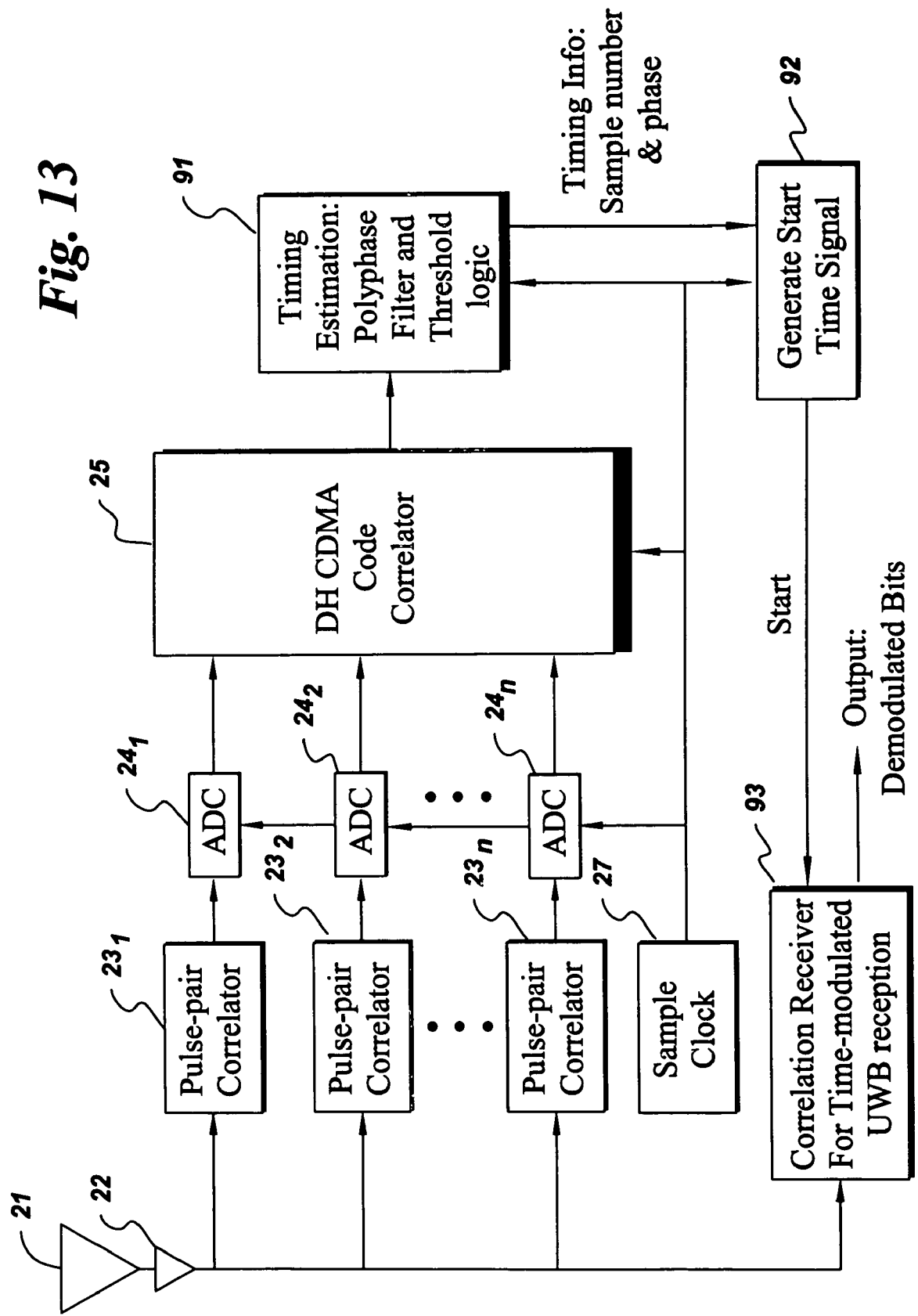

SYNCHRONIZATION OF ULTRA-WIDEBAND COMMUNICATIONS USING A TRANSMITTED-REFERENCE PREAMBLE

CROSS REFERENCE TO RELATED APPLICATIONS

The subject matter of this application is related to copending patent application Ser. No. 09/753,443 filed Jan. 3, 2001, by H. W. Tomlinson, Jr., J. E. Hershey, R. T. Hoctor, and K. B. Welles, II, for "Ultra-Wideband Communication System", copending patent application Ser. No. 09/974,032 filed Oct. 10, 2001, by R. T. Hoctor, D. M. Davenport, A. M. Dentinger, N. A. Van Stralen, H. W. Tomlinson, Jr., K. B. Welles, II, and J. E. Hershey for "Ultra-Wideband Communication System and Method Using a Delay-Hopped, Continuous Noise Transmitted Reference", and copending patent application Ser. No. 09/973,140 filed Oct. 9, 2001, by R. T. Hoctor, J. E. Hershey and H. W. Tomlinson, Jr., for "Transmitter Location for Ultra-Wideband, Transmitted-Reference, CDMA Communication System", all of which are assigned to the assignee of this application. The disclosures of applications Ser. No. 09/753,443, Ser. No. 09/974,032 and Ser. No. 09/973,140 are incorporated herein by reference.

BACKGROUND OF THE INVENTION

This invention relates to a transmitted-reference, delay hopped (TR/DH) ultra-wideband radio communications system and, more particularly, to a method of initial synchronization, or acquisition, of ultra-wideband (UWB) communications having other modulation formats by means of a transmitted-reference preamble.

Ultra-wideband is a form of radio communications that operates by transmitting very short pulses, or radio frequency (RF) bursts. At the present time, the most well-known method of UWB communication uses the pulse position modulation (PPM) scheme disclosed by M. Z. Win and R. A. Sholtz in "Impulse radio: how it works", *IEEE Comm. Letters*, vol. 2, pp. 36–38, February 1988, and by L. W. Fullerton, "Spread spectrum radio transmission system", in U.S. Pat. No. 4,641,317. This scheme is used, for example, in optical communications, and it is described in many standard textbooks, such as J. G. Proakis and M. Salehi, *Communications Systems Engineering*, Prentice Hall, 1994, pp. 439–442. The method works by transmitting and receiving pulses in one of a number of time slots in successive time frames, which requires close time synchronization between the transmitter and the receiver.

The pulse position modulation (PPM) scheme is sometimes called a "time modulated" UWB method, because the relative time of arrival of the pulses is important information that must be known by the receiver in order to demodulate the transmission. Other methods of time modulated ultra-wideband modulation are also possible. For example, the phase or polarity of a received pulse could be used to represent the transmitted information. In such a scheme, the time between transmitted pulses may be modified in a pattern known to both the transmitter and receiver. The scheme just described is known as time hopping, and it is described in M. K. Simon, J. K. Omura, R. A. Sholtz and B. K. Levitt, *Spread Spectrum Communications Handbook*, Revised Edition, McGraw-Hill, 1994. The time hopping scheme provides the time modulated UWB transmission with a certain level of multiple access capacity; that is, it allows for multiple transmissions to be simultaneously demodulated.

The time hopping is also the multiple access method used with PPM ultra-wideband. See R. A. Sholtz, "Multiple access with time-hopping impulse modulation", *Proc. IEEE MILCOM '93*, Boston, October 1993. When time-hopping is used with PPM, we refer to the overall communications method as PPM/TH ultra-wideband. This scheme has been promoted as giving a very large multiple access capacity to the UWB channel, even at high data rates.

One problem with any time modulated UWB transmission scheme is the difficulty of establishing time synchronization. This is especially true when the transmissions consist of bursts of transmitted symbols, in which case the receiver has no a priori information whatsoever about the transmitters timing, and, in addition, it must detect the presence of the transmission prior to attempting to demodulate it. (On the other hand, if the transmissions are imbedded within some kind of data packet framework, the receiver might know approximately when a transmission is to start.)

In the absence of multiple access interference (MAI), the clock governing the pulse slots can easily be recovered from the received signal, while the frame clock must be recovered from a transmitted acquisition sequence. This problem has received some attention in the literature. See R. Gagliardi, J. Robbins and H. Taylor, "Acquisition sequences in PPM communications", *IEEE Trans. Information Theory*, vol. IT-33, pp. 738–744, September 1987. However, multiple access interference worsens the problem significantly, since the pulse-slot clocks of the separate interfering transmitters will not be synchronized with that of the desired transmitter. This situation requires the acquisition of both the slot clock and the frame timing through the use of an acquisition sequence. This requirement means that the initial synchronization is very computationally demanding, and this computational burden can result in either a very long acquisition time, a very expensive receiver, or possibly both.

Recently, a new alternative UWB communications scheme, called transmitted-reference, delay-hopped (TR/DH) ultra-wideband, as been invented, as described in copending patent application Ser. No. 09/753,443. The term "transmitted reference" refers to the transmission and reception of multiple pulses in such a manner that synchronization with the individual pulses is unnecessary. Transmitted reference UWB transmits pulses in pairs, and thereby induces a correlation at the receiver that can be measured by standard means. The term "delay-hopped" refers to a code-division multiple access scheme which uses transmitted-reference UWB.

In addition to the standard ultra-wideband (or "impulse radio") version of TR/DH, the inventors have invented and experimented with a version of TR/DH that uses wideband noise as a carrier, rather than impulse trains. This version of the invention induces correlation at the receiver by transmitting the sum of two versions of a wideband continuous noise, separated by a lag known to the receiver. This invention has advantages in that the noise carrier may be easier to generate than the impulse train carrier, and it is described in copending patent application Ser. No. 09/974,032.

Although the TR/DH scheme does not have the synchronization problem of time modulated schemes such as PPM/TH, its signal-to-noise ratio (SNR) is worse and it is more susceptible to multiple access interference. On the basis of predictions of performance based on mathematical modeling and computer simulation, these effects appear to limit the multiple access capacity of TR/DH to the degree that it will not be suitable for some applications. It would be advantageous to combine the low-complexity synchronization properties of TR/DH with the multiple access capacity of a time modulated UWB method, such as PPM/TH.

BRIEF SUMMARY OF THE INVENTION

The present invention provides a method of initial synchronization, or acquisition, of time modulated ultra-wideband (UWB) communications using a transmitted-reference preamble. The method requires that the transmitter first send a TR/DH burst; such a burst is easily detected and can be processed to provide a time mark accurate to within a few nanoseconds. Following the transmission of the TR/DH burst, the transmitter waits a fixed period of time, the duration of which is known to the receiver, and then the transmitter sends a burst of PPM/TH or other time modulated UWB. After the reception of the first burst, the receiver can estimate the time of reception of the second burst to the accuracy of the time mark. In many practical cases, such as the indoor multipath channel, this initial estimate of the time of reception of the time modulated UWB burst will be enough to allow its demodulation, albeit at what might be a reduced signal-to-noise ratio (SNR). The initial acquisition on the basis of the TR/DH preamble may be refined during demodulation of the time modulated burst so as to obtain a higher SNR.

Copending patent application Ser. No. 09/753,443 describes a transmitted-reference ultra wideband (UWB) communication that made use of code-division multiple access (CDMA). Copending patent application Ser. No. 09/974,032 describes a transmitted-reference ultra-wideband (UWB) communication method identical to that of copending patent application Ser. No. 09/753,443 but making use of a continuous wideband noise as a carrier. Copending patent application Ser. No. 09/973,140 has to do with location of transmitters using the UWB communications system of patent application Ser. No. 09/753,443. The present invention discloses how the communications methods of patent applications Ser. No. 09/753,443 and Ser. No. 09/974,032 can be combined with a standard UWB communications scheme, as disclosed by M. Z. Win and R. A. Sholtz and the patent to Fullerton, supra, to overcome the latter's problems with initial synchronization, or acquisition. This is especially important when the communications are bursty. The method makes use of the same scheme for deriving time information from the transmitted-reference signal as did the method of copending patent application Ser. No. 09/973,140.

BRIEF DESCRIPTION OF THE DRAWINGS

FIG. 1 is a block diagram showing the structure of the TR/DH code word;

FIGS. 11 and 12 are, respectively, a block diagram of the burst structure and a plot illustrating the expected output of the DH code correlator for a time modulated UWB burst transmission with a TR/DH preamble to provide initial synchronization; and FIG. 13 is a block diagram of a receiver for a time modulated UWB burst transmission with a TR/DH preamble to provide initial synchronization.

DETAILED DESCRIPTION OF THE INVENTION

Figure 2:
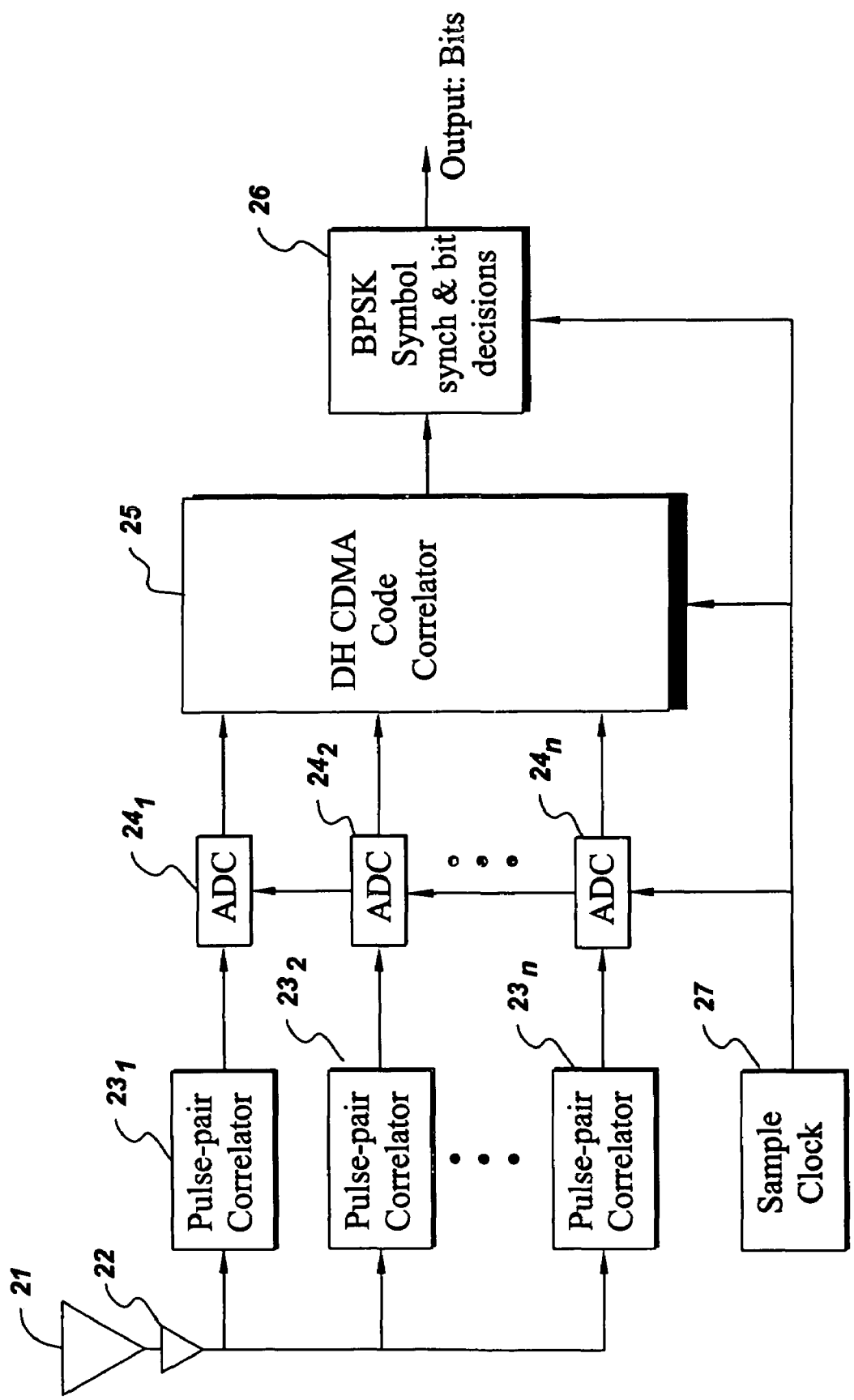
FIG. 2 is an overall block diagram of a TR/DH receiver.

The TR/DH scheme disclosed in copending patent applications Ser. No. 09/753,443 and Ser. No. 09/974,032 will first be described.

A TR/DH code word consists of $N_c$ chips, transmitted sequentially, as depicted in FIG. 1. All $N_c$ chips have the same fixed duration, $T_c$. In the impulse radio version of the invention, each chip is composed of $N_p$ pulse pairs, and each pulse pair is composed of two pulses. All pulse pairs that are transmitted in the same chip interval have the same time separation between their pulses. Pulse pairs transmitted in different chip intervals are, in general, characterized by different time intervals between the leading and trailing pulses. The time between pulse pairs within a given chip interval varies randomly about some nominal or average pulse repetition time. Each chip is associated with a relative polarity between the leading and trailing pulses, and all the pulse pairs in the chip share this relative polarity. The relative polarity of the two pulses is used to associate a binary value with each chip. Note that the chip values are distinct both in associated delay value and in the value of the transmitted bit (±1).

The noise carrier version of the invention differs from the impulse carrier version only in that a pair of identical, continuous, wideband noise waveforms is transmitted rather than a sequence of pairs of RF pulses. The relative polarity of the two waveforms and the duration of the time interval separating them are both modulated in the same manner as in the impulse radio version of the invention.

Typical values of the parameters are as follows. The number of chips in a code word ($N_c$) will be in the range of 50 to 1000, and the duration of each chip will be in the range of 1 to 10 μs. The number of pulses in a chip interval ($N_p$) will be from 4 to 50. The average time between pulse pairs will be about 100 ns. The time intervals separating the two pulses of a pulse pair are drawn from a small set of possible time intervals, typically from 4 to 16 of them, ranging from 1 to 30 ns. The specific values of these delays will depend on the carrier, in that the interpulse delays should exceed the reciprocal of the carrier bandwidth. For example, if 500 chips, each consisting of 20 pulse pairs with an average pulse repetition time of 100 ns are transmitted, the entire TR/DH code word will take 1 millisecond to transmit. If each code word transmits one bit of information (BPSK), then the bit rate is 1 Kbit/sec.

The DH code words are the most important part of the delay-hopped CDMA scheme. They can easily be found using computer search. For example, we have generated a set of 1000 of them, each composed of 200 chips, with delays drawn from a set of 16 possible delays. All of these code words have autocorrelation side lobes that are less than 7% of the peak autocorrelation value. The maximum cross-correlation at any lag between any pair of these words is less than 10% of the peak autocorrelation. Longer codes, composed of more chips, will have even better correlation properties.

The receiver for a TR/DH code word consists of a bank of pulse-pair correlators followed by a code word correlator, as depicted in FIG. 2. More particularly, a received signal from antenna 21 is amplified by RF amplifier 22 and input to a bank of pulse-pair correlators $23_1$ to $23_n$. The analog output of each pulse pair correlator is digitized before being input to the all-digital DH code correlator 25. A typical value of the sample rate at which this digitization takes place would be in the range of 1 to 20 MHz, and would provide at least two samples in each chip interval. The outputs of the correlators $23_1$ to $23_n$ are thus fed to respective analog-to-digital converters (ADCs) $24_1$ to $24_n$, the outputs of which are input to the delay hopped code division multiple access (DH CDMA) code word correlator 25. The output of the code word correlator 25 is input to BPSK symbol synchronization and bit decision logic 26. Each of the ADCs $24_1$ to $24_n$, the code word correlator 25 and the synchronization and bit decision logic 26 receive a clock signal from a sample clock 27.

Figure 3:
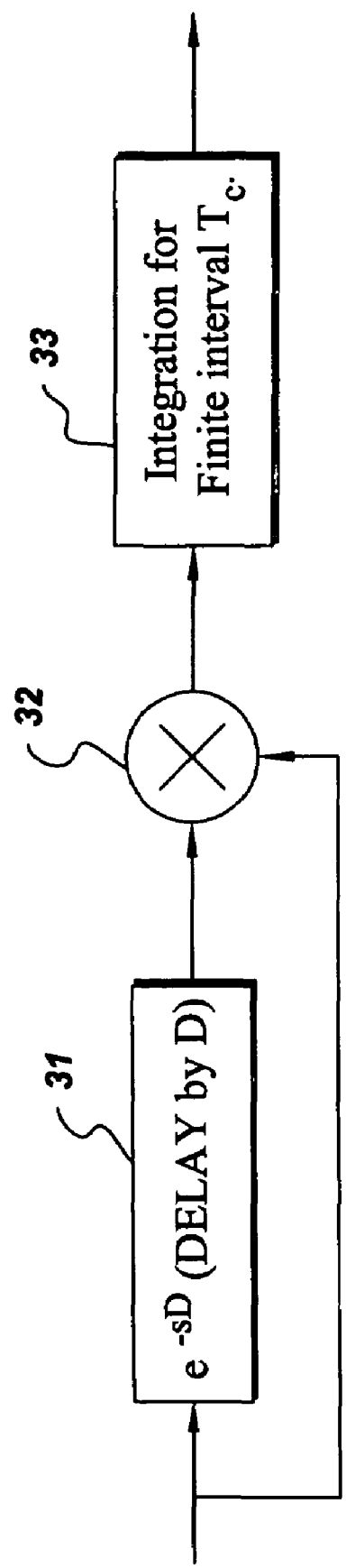
FIG. 3 is a block diagram of a pulse pair correlator for a lag D.

The pulse pair correlator is depicted in FIG. 3. A pulse-pair correlation consists of a delay 31, a signal multiplier 32 and a finite-time integrator 33. The signal is split into two paths, one of which is delayed by delay 31. The two versions of the received signal are multiplied in multiplier 32, and the product is integrated over a specified time, $T_c$, by integrator 33. The integration time is equal to the chip time. The delay is such that the leading pulse or noise carrier of the delayed circuit path is registered in time with the trailing pulse or noise carrier of the un-delayed circuit path. This non-zero-mean product is integrated over a chip interval to produce a chip signal.

Figure 4:
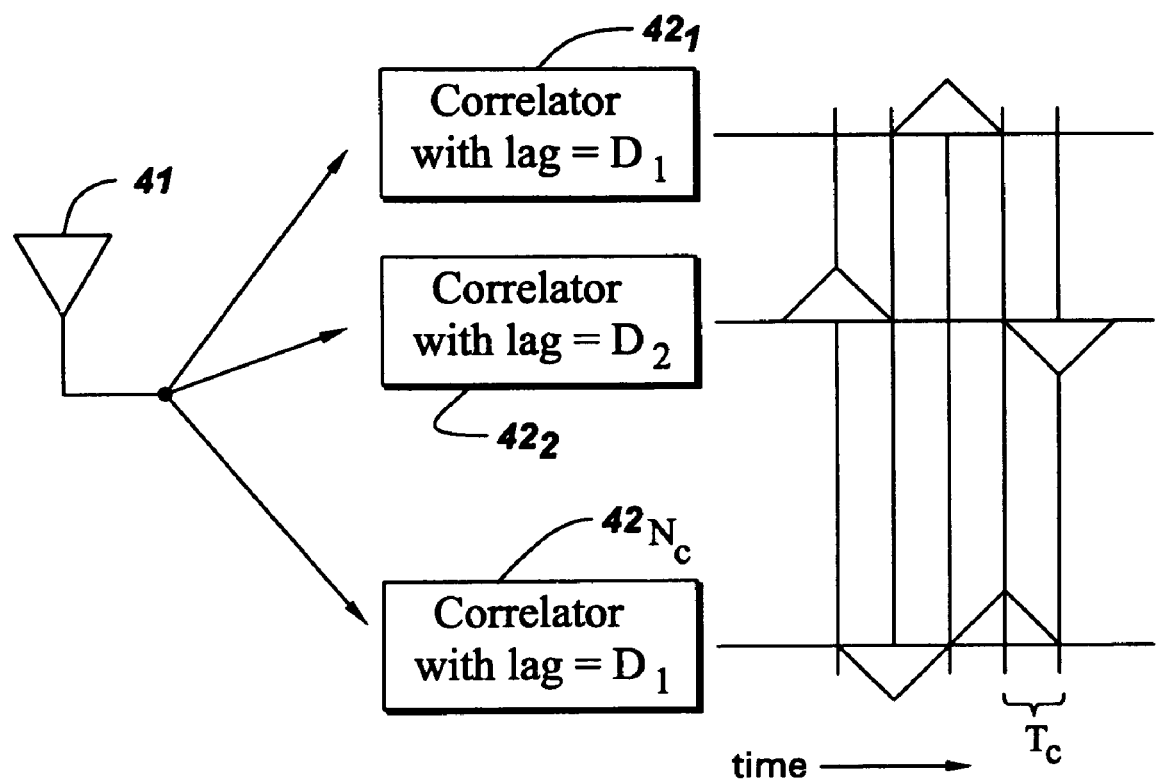
FIG. 4 is a block diagram of the first stage of the UWB TR delay-hopped CDMA receiver, with illustrations of a set of notational outputs of the pulse pair correlators.

The chip signals at the outputs of the bank of pulse pair correlators are characteristically peaked as shown in FIG. 4. The antenna 41 provides inputs to correlators $42_1$ to $42_{N_c}$, which comprise a bank of pulse-pair correlators shown in FIG. 3. These signals are of duration approximately equal to twice the integration time of the pulse pair correlators. This set of waveforms will be sampled at a rate yielding at least two samples per chip period, and then sent to a delay-hopped code detector.

The CDMA code correlator will take samples of the multiple outputs of the bank of pulse pair correlators and add them together in a manner dictated by the expected CDMA code word. The objective of this operation is to produce the registered sum of all the chip signals. When the expected code word matches the transmitted code word, this operation will have the effect of applying a gating waveform, matched to the entire delay hopped (DH) code word waveform, to the observed data at the output of the correlators. If the gating waveform matches the shape of the chip signal waveform, a matched filter is implemented; however, this requires knowledge of the relative timing of the sample clock and the transmitter chip clock. If the gating waveform applied to the individual chip is rectangular, with duration $2T_c$, then the effect of the CDMA code word correlator is to add all of the individual chip waveforms in phase, producing an output which is a high-SNR version of the individual chip waveform.

Figure 5:
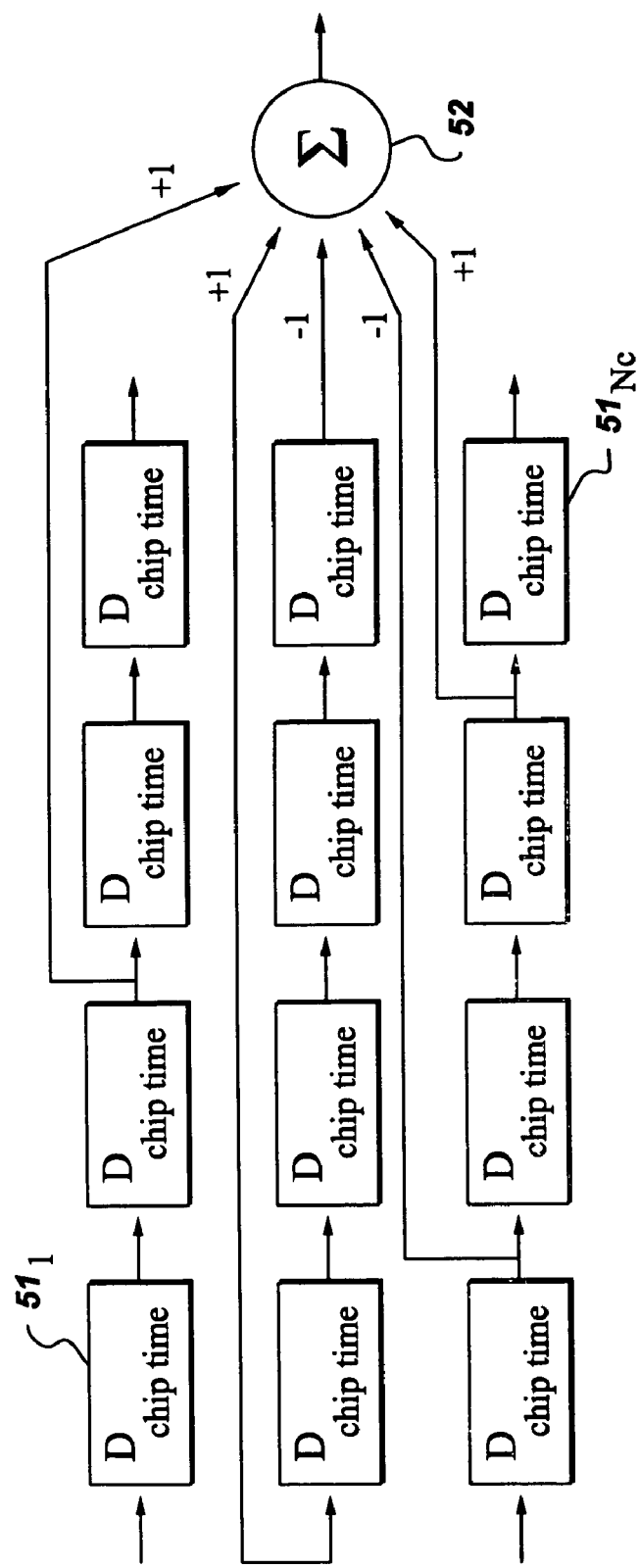
FIG. 5 is a block diagram of a simple example of the delay-hopped code correlator.

The structure of one embodiment of the CDMA code word correlator is depicted in FIG. 5. The specific code correlator depicted uses a CDMA code word that matches the correlator bank output depicted in FIG. 4. The code word correlator comprises multiple chip time delays ($D_{chip\ time}$) $51_1$ to $51_{N_c}$, and a summer 52. Note that the chip time delays ($D_{chip\ time}$) and signs (additions and subtractions) cause the elementary correlator peaks to be aligned in time with the same signs. The delayed outputs of the analog-to-digital converters (ADCs) from the CDMA code word correlator are summed by the summer and provided as the output. Since the sample period of the ADCs has been specified to be a fraction of the chip period, the delays in FIG. 5 may, in one embodiment, all be implemented as a number of digital storage devices, with provision for passing stored data from one to the next. Thus, in one embodiment, the CDMA code word correlator of FIG. 5 depicts a synchronous digital circuit such as would be implemented in a programmable logic device (PLD), such as a field programmable gate array (FPGA) or the like, or an application specific integrated circuit (ASIC).

Specifically, if N is the number of samples per chip (an integer), then the total number of samples from each pulse pair correlator that must be retained for DH code correlation is N, times $N_c$. If $N_d$ is the number of different intra-pulse-pair delays used by the code (and therefore the number of pulse pair correlators in the receiver), then the total number of samples to be retained for correlation is N, times $N_c$, times $N_d$. Of these samples, only those delays matching the delay specified by the structure of the code word should be added. Since we have specified that the number of samples in each chip interval be an integer, the number of samples in each pulse-pair correlator output waveform is an integer. Furthermore the samples in each of the pulse-pair correlator output waveforms have the same time relationship to the start times of the chips for all waveforms, so that they can be added up coherently, given knowledge of the code transmitted code word.

Figure 6:
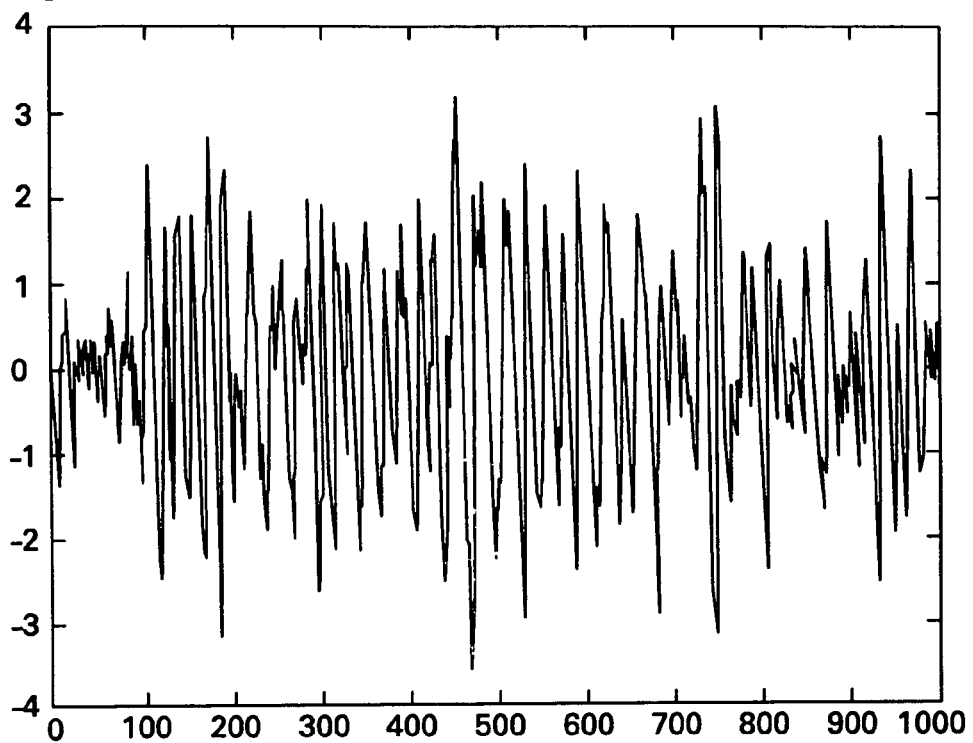
FIGS. 6, 7, 8, and 9 are four plots, illustrating the observed waveforms at four different points in the receiver of FIG. 2, under the assumption of a noise carrier.
Figure 7:
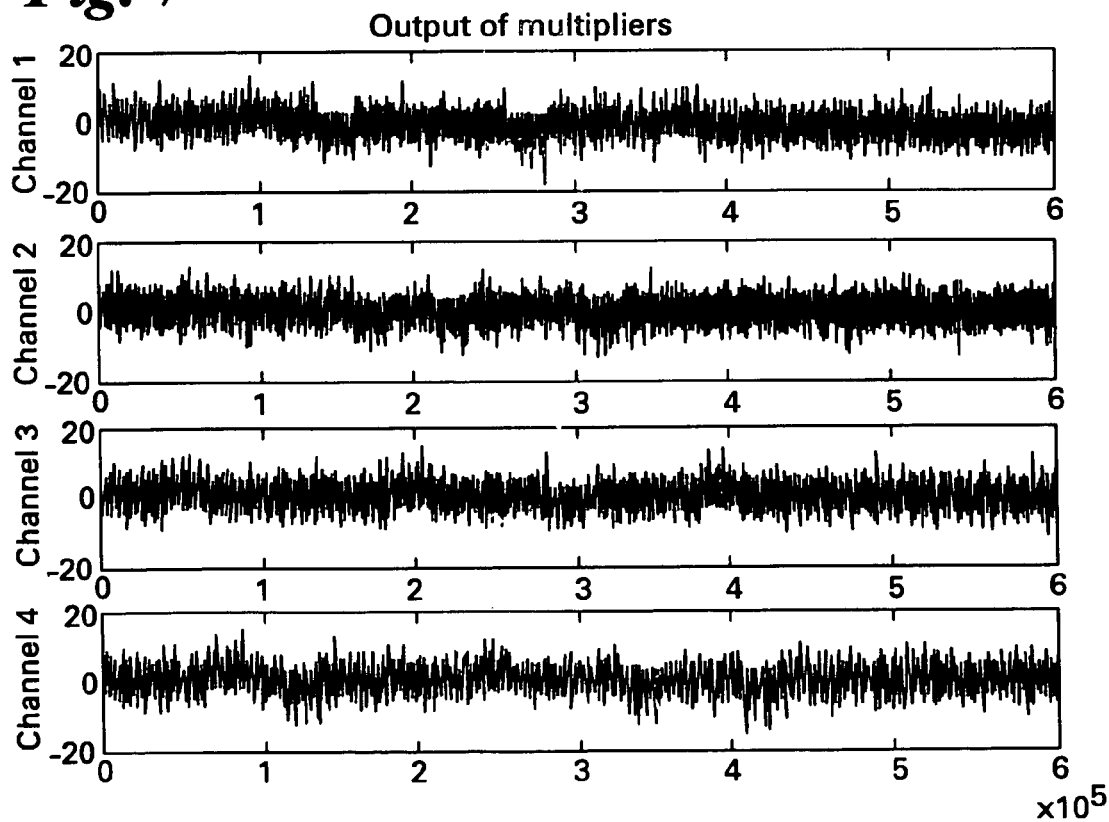
Figure 8:
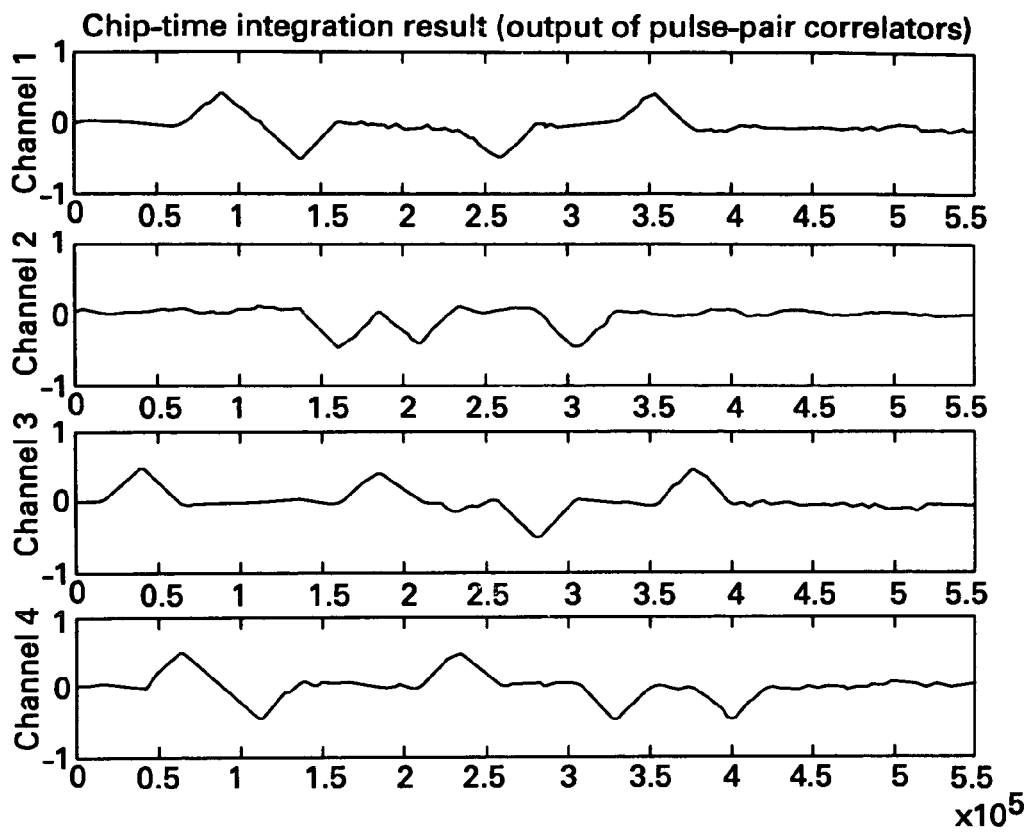
Figure 9:
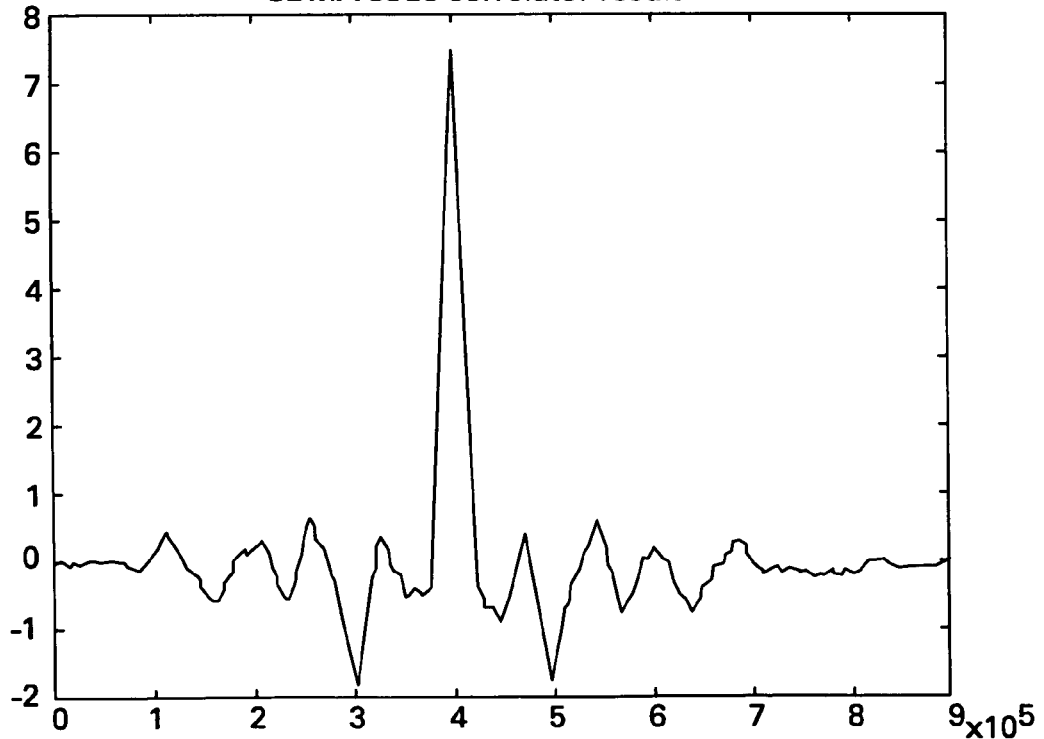

To make this idea more concrete, let us consider an example depicted in FIGS. 6, 7, 8, and 9, which show various stages in the demodulation of a TR/DH transmission with a bandpass noise carrier. FIG. 6 is a portion of the noisy signaling waveform, and the segment depicted has a duration of 25 nanoseconds. FIG. 7 depicts the outputs of the four multipliers in the bank of correlators. Each correlator in the bank of correlators has, for example, the structure depicted in FIG. 3. FIG. 8 depicts a time interval of 15 microseconds, during which the transmission of a single TR/DH code word of duration 9.6 microseconds takes place. The four pulse-pair correlators are tuned to the four delays used in the modulation: 1.8 nanoseconds, 2.8 nanoseconds, 3.8 nanoseconds, and 4.8 nanoseconds. Note that the mean levels of the outputs of the multipliers shift away from zero at certain times; these times correspond to the times of the transmitted chips. FIG. 8 depicts the outputs of the four integrators of the pulse-pair correlators. The waveforms are the actual chip waveforms arising from the simulation. The DH CDMA code transmitted in this example can be expressed as an ordered sequence of integers {3, 4, 1, 4, 1, 2, 3, 2, 4, 1, 3, 2, 4, 1, 3, 4}. This sequence of numbers represents the numbers of the transmitted delays, numbered from shortest to longest, and the signs of the numbers denote the polarity of the transmitted chip. The CDMA code word can be "read off" the waveforms depicted in FIG. 8. For example, reading from left to right, the first channel to produce an output waveform is channel 3, and the polarity of that waveform is positive. FIG. 9 shows the output of a DH CDMA code correlator of the type depicted in FIG. 5 when the input consists of the chip waveforms depicted in FIG. 8. For this relatively short code, the code correlator output has high side lobes. Other DH CDMA codes will have upwards of a thousand chips, and a much lower ratio of peak absolute side lobe level to peak main lobe level in the output correlation.

The output of the DH code correlator in response to a transmitted DH code word is a sampled waveform of the same duration and shape as a chip waveform, but which has a higher SNR than the individual chip waveform. This output is depicted schematically in FIG. 10.

Once the output samples of the code word correlator (represented by black diamonds in FIG. 10) have been formed, the receiver must decide if a code word has been received during the last sample interval. If this decision is positive, other data must be derived from the samples. In the data transmission application of TR/DH, the code word would be modulated by a ±1, which would represent the transmitted information.

Figure 10:
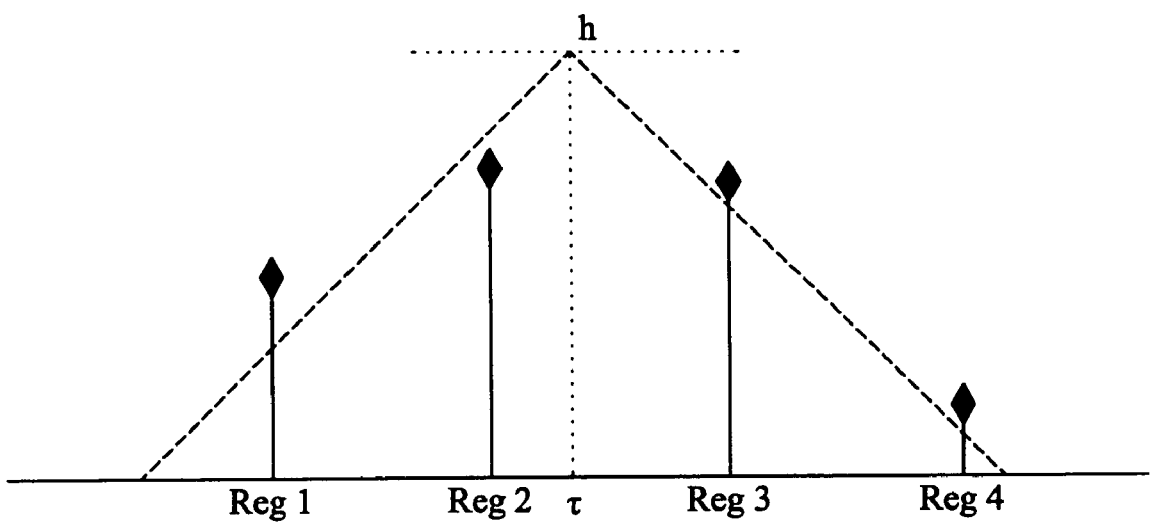
FIG. 10 is a diagram illustrating the output of the DH code correlator.

For the PPM/TH preamble application, the time at which the code word was received is the most important piece of information. One way to estimate this value is to fit a model of the pulse-pair correlator output waveform to the samples at the output of the code word generator. Such a fit could be done on the basis of minimum squared error, which would result in the optimum fit for Gaussian observation noise. The possible result of this algorithm is shown in FIG. 10, superimposed over the sample values. The fitted model, which is triangular in shape to match the main lobe of the DH CDMA code correlator output function depicted in FIG. 9, is controlled by two parameters, the height of the peak, h, and the location in time of the peak, τ. This information can be supplemented by the sum of squared errors for the best fit whose peak value is within the current sample interval. The absolute value of the peak value and the sum of squared errors can be combined and compared to a threshold to detect the code word. The value of c can be used as an estimate of the time of arrival of the code word.

In particular, the minimum mean squared error estimate of the height of the fitted triangle, given the DH code correlator output data $\{x_0, x_1, \ldots, x_N\}$ is given by $$\hat{h}\phi = \frac{\sum_{n=0}^{N} x_n T(n, \phi)}{\sum_{n=0}^{N} T^2(n, \phi)},$$

where the function $T(n,\phi)$ is a triangular model of the expected waveform. The first argument, n, is the sample number; the adjacent samples of the model may be considered to be separated by the same time interval as are the data samples. There will be N+1 samples in the model, corresponding to the number of samples expected in the mainlobe of the code correlator output waveform. The second argument of the model is the relative phase of the model with respect to the samples used in the multiplications above. The phase of the model can be explained by assuming that the model is sampled at some high rate, say M times the output sample rate of the code correlator, and so the entire model is composed of M(N+1) samples. M different sets of (N+1) model points can be chosen, for which the model points are separated by M high-rate samples. Each of these sets of model points can be regarded as a different phase of the model, for phases indexed $\phi=1, \ldots, M$.

In addition to the minimum mean squared error estimate of the height of the output waveform, given above, we may also require the error incurred by fitting the date with the model. This error is given by $$E_\phi = \sum_{n=0}^{N} \left(x_n - \hat{h}T(n, \phi)\right)^2,$$

where all symbols are defined as above. In general, the sample number and phase corresponding to the smallest error will define τ, the estimate of the time of arrival of the TR/DH burst. Because the model is over-sampled, the time of arrival can be determined to an accuracy of a fraction of the sample period.

When the receiver is looking for a TR/DH code word without any prior synchronization information, the algorithm just described is executed for each new set of samples, that is, at the end of each sample interval. For each new sample, all phases of the model must be applied to the last (N+1) saved data samples. When a set of results is computed for which the heights exceeds a pre-defined threshold and the modeling error is lower than the error values computed for all nearby phases of the model, then we convert that sample number and phase into a time of arrival for the TR/DH burst. The resulting time-of-arrival measurement is known relative to the A/D converter sample clock, which determines the output sample times of the DH CDMA code correlator.

It is worth noting that, for the impulse radio version of the invention, the output of the pulse-pair correlator is only approximately triangular, even given an ideal finite-interval integrator. This is because the individual pulse-pair correlator output waveforms are not smoothly triangular, but rather ascend and descend in discrete steps, rather than smoothly, as shown in FIG. 4. The locations of these steps in time change randomly and correspond to the times of arrival of individual pulse pairs. It can be shown that the sum of such waveforms converges to a triangle. On the other hand, for a noise carrier, the chip waveforms are triangular, as depicted in FIG. 8.

In the time-of-arrival (TOA) estimation method described above, what is actually measured is the time of the peak of the last chip signal of the packet. This peak represents the time at which pulse-pairs separated by a certain lag stop arriving, and that tag corresponds to the lag of the last chip sent to form the code word. If the transmitting device has only a direct path transmission from the transmitter to the receiver, then the time-of-arrival value will be determined by the time of transmission and the distance between the receiver and the transmitter involved.

On the other hand, any multipath will tend to spread out (in time) the peaks of the chip signals, which will have the effect of delaying the detected times of arrival relative to the direct path times of arrival. This delay will amount to about half the observed multipath spread and is likely to be on the order of 10 to 50 ns for an indoor environment resembling an office building. (See Saunders et al., *Antennas and Propagation for Wireless Communication Systems*, John Wiley & Sons, 1999, pp. 282–285.) However, the time-modulated UWB pulse that is to be located by means of the TR/DH preamble will be subject to exactly the same multipath as modifies the TOA estimate for the TR/DH header. This means that the estimate will still fall, on average, in the middle of the elongated pulse that arrives at the receiver after passing through the multipath channel.

Another potential source of inaccuracy in the TOA estimate is clock mismatch between the transmitter's chip clock and the receiver's sample clock. Such a mismatch has the effect of shifting the locations of the samples on the waveforms that emerge from the pulse-pair correlators' integrators. Over the course of the reception of a transmitted TR/DH word, this precession of the phase of the sample clock with respect to the phase of the received waveform has the effect of smearing out the output waveform in time. For example, if the transmitted word is 400 microseconds long, and the transmit and receive clock frequencies are mismatched by 10 PPM, then the composite waveform at the output of the CDMA code correlator will be smeared by 4 nanoseconds. The expected value of the resulting TOA estimation error would be half that value. Unlike multipath, which produces only over-estimation errors, this precession in clock frequencies may result in either over- or under-estimation of the TOA. Those skilled in the art will appreciate that the maximum clock mismatch is determined by the stability of the oscillators used to produce the transmit and receive clock waveforms. The maximum clock frequency mismatch and the allowable error due to it will determine the maximum length of a word that may be coherently combined to form a TOA estimate, and therefore the maximum length of a TR/DH preamble. The word length directly influences the detection probability, and therefore the maximum transmission range. Such design trade-offs can be made by one skilled in the art.

In general, the accuracy of the time-of-arrival estimate will decrease with the noise level and the multiple access interference level. On the other hand, the accuracy will increase with the length of the code word, because the effective SNR of the final step will increase with coding gain. The accuracy will also increase with the sample rate, because with more samples, the error in fitting the model will decrease.

The invention disclosed here is the use of a single TR/DH code word as a preamble for a message transmitted using PPM/TH.

FIG. 11 depicts the proposed PPM/TH burst transmission with TR/DH preamble 81 and PPM/TH transmission data packet 82. FIG. 12 is an example of what the output of the TR/DH correlator output might look like at the receiver during reception of this burst. (In the context of the algorithm described above, the estimated value of the parameter "h", possibly modified by the sum of squared errors, is the correlator output.) The time of the largest peak value of the correlator output is used as a time mark, which synchronizes the receiver to the PPM transmission that follows. (This time would be estimated by the parameter τ in the waveform fitting algorithm described above and depicted in FIG. 4.) The smaller peaks in the correlator output represent auto-correlation side lobes and should be small compared to the value of the largest peak.

Experimentation with prototype TR/DH transmitters and receivers in an indoor environment has shown that the accuracy of the method described above is in the range of less than ten nanoseconds of error. In a typical indoor multipath situation, this means that the error in location the first pulse of the time-modulated burst is less than the elongation that the pulse will suffer. (Recall that at least part of the measured error is from multipath.) This means that the TR/DH preamble can be used to locate the first pulse of a time modulated burst. This will speed up synchronization dramatically over the current performance of time modulated UWB in burst mode, but it will not remove the current requirement that additional synchronization hardware be in place to perform the fine synchronization after initial synchronization has been achieved.

FIG. 13 is a block diagram of a receiver for a time modulated UWB burst with a TR/DH preamble for synchronization. It is based on the receiver shown in FIG. 2, but has been modified to have the demodulation mechanism replaced by a mechanism for deriving time mark from a TR/DH preamble and using it to trigger a receiver from time modulated UWB. Therefore, like reference numerals in FIGS. 2 and 13 represent identical or similar structures. The output samples of the DH CDMA code correlator 25 are input into a polyphase filter module 91. This module implements the minimum mean squared error computations given above. This is a polyphase computation in that, for every input sample, all the squared error computation must be done for all the phases of waveform model. Since the input to this module could be sampled at a rate as great as 20 Msamples/second, this module can be implemented as a small ASIC or PLD. The logic to process the sequence of minimum mean square error and determine a time of arrival from it has been shown as part of this module in FIG. 9. Alternatively, for lower sample rates and longer chip times, this function could be implemented in a Digital Signal Processor (DSP).

The output of the polyphase filter and decision mechanism would be conveniently expressed in the form of a sample number, relative to the most recent sample, and a phase, which can be regarded as a fraction of a sample period. This numerical data identifies a moment in time and must be converted into a trigger signal by the "generate start time signal" logic 92 that starts the correlation receiver 93 for the time modulated UWB transmission at the proper time. This function is conveniently performed by a DSP that has access to the sample clock 27 to which the numerical time mark is referenced.

Note that, although the sample clock is the only clock shown on the block diagram of FIG. 13, one or more higher frequency clocks will have to be distributed to run the ASICs, PLDs or DSPs used in the implementation. These clocks are not shown in FIG. 13.

While the invention has been described in terms of a preferred embodiment, those skilled in the art will recognize that the invention can be practiced with modification within the spirit and scope of the appended claims. In particular, it will be understood that the synchronization method and apparatus according to the invention may be applied to any RF burst transmission, no matter what the modulation format, by the use of a TR/DH preamble.

What is claimed is:

1. A method of initial synchronization, or acquisition, of a radio frequency (RF) burst transmission comprising the steps of:

generating at a transmitter a transmitted-reference preamble;

transmitting by the transmitter a transmitted-reference, delay-hopped (TR/DH) burst to a receiver;

detecting at the receiver the TR/DH burst to generate a time mark;

following the transmission of the TR/DH burst, waiting by the transmitter a fixed period of time, the duration of which is known to the receiver, wherein the TR/DH burst comprises a code word consisting of $N_c$ chips, transmitted sequentially, having a fixed duration, $T_c$, each chip being composed of $N_p$ pulse pairs;

after the expiration of the fixed period of time, transmitting by the transmitter a burst of modulated RF bearing transmitted message data; and using by the receiver the generated time mark to begin reception of the burst of the RF burst transmission from the transmitter.

2. The method of initial synchronization, or acquisition, of an RF burst transmission recited in claim 1, wherein the RF burst transmission is a burst of time modulated ultra-wideband (UWB) communications transmission.

3. The method of initial synchronization, or acquisition, of an RF burst transmission recited in claim 2, wherein the burst of time modulated UWB is a pulse position modulated, time-hopped (PPM/TH) data packet.

4. The method of initial synchronization, or acquisition, of an RF burst transmission recited in claim 1, wherein the step of detecting at the receiver the TR/DH burst to generate a time mark is performed by a polyphase filter and decision logic.

5. The method of initial synchronization, or acquisition, of an RF burst transmission recited in claim 1, wherein the step of detecting at the receiver the TR/DH burst is performed by estimating a time-of-arrival (TOA) of a burst of RF composed of a TR/DH code word using a model.

6. The method of initial synchronization, or acquisition, of an RF burst transmission recited in claim 5, wherein the step of estimating the TOA is performed by fitting the model by a method of least squares fitting.

7. The method of initial synchronization, or acquisition, of an RF burst transmission recited in claim 5, wherein the step of estimating the TOA is performed using a polyphase approach making use of a model with a number of different phases.

8. In a radio frequency (BF) burst communications system comprising a transmitter and a receiver, apparatus for initial synchronization comprising:
a preamble generator at the transmitter for generating at a transmitter a transmitted-reference preamble, the transmitter transmitting a transmitted-reference, delay-hopped (TR/DH) burst to the receiver, wherein the TR/DH burst comprises a codeword consisting of $N_c$ chips, transmitted seciuentially, having a fixed duration, $T_c$, each chip being composed of $N_p$ pulse pairs;
a detector at the receiver for detecting the TR/DH burst to generate a time mark;
a time delay means at the transmitter for measuring a fixed period of time, the duration of which is known to the receiver, following the transmission of the TR/DH burst, the transmitter at the expiration of the fixed period of time transmitting an RF burst transmission; and
a correlation receiver in the receiver and responsive to the time mark for beginning reception of the RF burst transmission from the transmitter and outputting demodulated bits.

9. The apparatus for initial synchronization recited in claim 8, wherein the RF burst transmission is a burst of time modulated ultra-wideband (UWB) burst transmission.

10. The apparatus for initial synchronization recited in claim 9, wherein the burst of time modulated UWB burst transmission from the transmitter is a pulse position modulated, time-hopped (PPM/TH) data packet.

11. The apparatus for initial synchronization recited in claim 8, wherein the detector at the receiver for detecting the TR/DH burst to generate a time mark comprises a polyphase filter and threshold logic.

12. The apparatus for initial synchronization recited in claim 8, the detector at the receiver further comprising:
a bank of pulse pair correlators receiving the TR/DH burst and generating outputs;
a bank of analog-to-digital converters (ADCs) digitizing the outputs of the bank of pulse pair correlators;
a DH code word correlator receiving the digitized outputs from the bank of ADCs and generating a correlation output; and
time estimation logic receiving the correlation output of the DH code word correlator and generating timing information for generating the time mark.

13. The apparatus for initial synchronization recited in claim 12, wherein the DH code word correlator is implemented as an application specific integrated circuit (ASIC).

14. The apparatus for initial synchronization recited in claim 12, wherein the DH code word correlator is implemented as a programmable logic device (PLD).

15. The apparatus for initial synchronization recited in claim 12, wherein time estimation logic detects the TR/DH burst by estimating a time-of-arrival (TOA) of a burst of RF composed of a TR/DH code word using a model.

16. The apparatus for initial synchronization recited in claim 15, wherein the time estimation logic estimates the TOA by fining the model by a method of least squares fitting.

17. The apparatus for initial synchronization recited in claim 15, wherein the time estimation logic estimates the TOA by using a polyphase approach making use of a model with a number of different phases.

18. The apparatus for initial synchronization recited in claim 15, wherein the time estimation logic is implemented using an application specific integrated circuit (ASIC).

19. The apparatus for initial synchronization recited in claim 15, wherein the time estimation logic is implemented using programmable logic device (PDL).

20. The apparatus for initial synchronization recited in claim 12, wherein the time estimation logic includes a programmable digital signal processor (DSP) to convert a numerical TOA estimate to a clock edge for starting reception of the RF burst transmission.

21. A receiver for a radio frequency (RF) burst communications system including apparatus for initial synchronization comprising:
a detector for detecting the a transmitted-reference, delay-hopped (TR/DH) burst to generate a time mark transmitted by a transmitter, wherein the TR/DH burst comprises a code word consisting of $N_c$ chips, transmitted sequentially, having a fixed duration. $T_c$, each chip being composed of $N_p$ pulse pairs; and
a correlation receiver responsive to the time mark for beginning reception of a burst of time modulated UWB from the transmitter and outputting demodulated bits.

22. The receiver for an RF burst communications system recited in claim 21, wherein the RF burst is a burst of time modulated ultra-wideband (UWB).

23. The receiver for an RF burst communications system recited in claim 22, wherein the burst of time modulated UWB from the transmitter is a pulse position modulated, time-hopped (PPM/TH) data packet.

24. The receiver for an RF burst communications system recited in claim 21, wherein the detector at the receiver for detecting the TR/DH burst to generate a time mark comprises a polyphase filter and threshold logic.

25. The apparatus for initial synchronization recited in claim 21, the detector at the receiver further comprising:
a bank of pulse pair correlators receiving the TR/DH burst and generating outputs;

a bank of analog-to-digital converters (ADCs) digitizing the outputs of the bank of pulse pair correlators;

a DH code word correlator receiving the digitized outputs from the bank of ADCs and generating a correlation output; and time estimation logic receiving the correlation output of the DH code word correlator and generating timing information for generating the time mark.

26. The apparatus for initial synchronization recited in claim 25, wherein the DH code word correlator is implemented as an application specific integrated circuit (ASIC).

27. The apparatus for initial synchronization recited in claim 25, wherein the DH code word correlator is implemented as a programmable logic device (PLD).

28. The apparatus for initial synchronization recited in claim 21, wherein the time estimation logic detects the TR/DH burst by estimating a time-of-arrival (TOA) of a burst of RF composed of a TR/DH code word using a model.

29. The apparatus for initial synchronization recited in claim 28, wherein the time estimation logic estimates the TOA by fitting the model by a method of least squares fitting.

30. The apparatus for initial synchronization recited in claim 28, wherein the time estimation logic estimates the TOA by using a polyphase approach making use of a model with a number of different phases.

31. The apparatus for initial synchronization recited in claim 28, wherein the time estimation logic is implemented using an application specific integrated circuit (ASIC).

32. The apparatus for initial synchronization recited in claim 28, wherein the time estimation logic is implemented using programmable logic device (PLD).

33. The apparatus for initial synchronization recited in claim 21, wherein the time estimation logic includes a programmable digital signal processor (DSP) to convert a numerical TOA estimate to a clock edge for starting reception of the RF burst transmission.

* * * * *